United States Patent [19]
Ohuchi et al.

[11] Patent Number: 5,911,004
[45] Date of Patent: *Jun. 8, 1999

[54] IMAGE PROCESSING APPARATUS FOR DISCRIMINATING IMAGE CHARACTERISTICS USING IMAGE SIGNAL INFORMATION OBTAINED IN AN IMAGE SCANNING OPERATION

[75] Inventors: Satoshi Ohuchi, Hachiohji; Sadao Takahashi, Kawasaki, both of Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/646,766

[22] Filed: May 8, 1996

[30] Foreign Application Priority Data

May 8, 1995 [JP] Japan .................................... 7-109213

[51] Int. Cl.⁶ ..................................................... G06K 9/00
[52] U.S. Cl. ......................... 382/173; 382/260; 358/456; 358/462
[58] Field of Search ...................................... 382/260, 173, 382/176; 358/455, 456, 462, 464, 530, 532, 534, 538, 540, 453

[56] References Cited

U.S. PATENT DOCUMENTS

| | | | |
|---|---|---|---|
| 4,722,008 | 1/1988 | Ibaraki et al. | 358/283 |
| 5,025,481 | 6/1991 | Ohuchi | 358/462 |
| 5,148,495 | 9/1992 | Imao et al. | 382/176 |
| 5,189,523 | 2/1993 | Sugiura et al. | 358/462 |
| 5,369,507 | 11/1994 | Tanaka et al. | 358/462 |

*Primary Examiner*—Thomas D. Lee
*Attorney, Agent, or Firm*—Oblon, Spivak, McClelland, Maier & Neustadt, P.C.

[57] ABSTRACT

An image processing apparatus generates color image signals representing an image of a scanned original document. A series of image discriminating units are provided. An edge discrimination unit discriminates edge regions with respect to each pixel. Further discrimination units discriminate other image regions, such as half tone regions, white background regions, photograph regions, or color regions, with respect to each pixel block. Discriminating results are stored in a memory to be used for subsequent image scans.

14 Claims, 4 Drawing Sheets

| 1 | 2 | 2 | 2 | 1 |
|---|---|---|---|---|
| 2 | 4 | 4 | 4 | 2 |
| 1 | 2 | 2 | 2 | 1 |
SMOOTHING FILTER COEFFICIENT
*FIG. 2A*
| 0 | −1 | −4 | −1 | 0 |
|---|---|---|---|---|
| −2 | −8 | 36 | −8 | −2 |
| 0 | −1 | −4 | −1 | 0 |
EDGE ENHANCEMENT FILTER COEFFICIENT
*FIG. 2B*
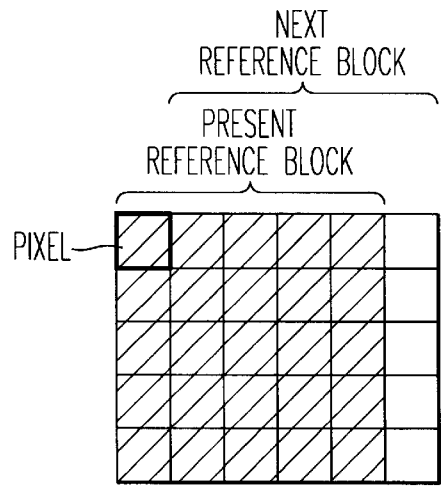
*FIG. 3*
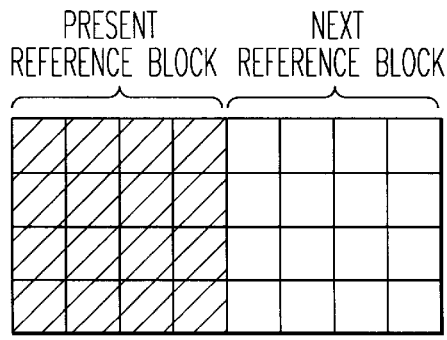
*FIG. 4*
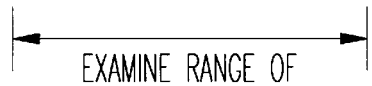
*FIG. 6*

IMAGE PROCESSING APPARATUS FOR DISCRIMINATING IMAGE CHARACTERISTICS USING IMAGE SIGNAL INFORMATION OBTAINED IN AN IMAGE SCANNING OPERATION

BACKGROUND OF THE INVENTION

1. Field of the Invention

This invention relates to the field of color image processing apparatuses, such as digital copying machines or color facsimile machines, and in particular relates to an apparatus which discriminates an image characteristic using image signals obtained by scanning an original document.

2. Description of the Related Art

A color image processing apparatus, such as a digital copying machine or a color facsimile machine, which optically reads an original document image by an image scanner, and obtains a color image signal represented using red, green, and blue (RGB) signals for each pixel, processes the image signals, and prints the color image using colorants of cyan, magenta, yellow, and black (CMYK) is well known.

Generally, the original document includes many image regions, such as a photographic image region, a gray scale image region, a half tone image region, a binary text image region, and so on. Therefore, in the color image forming apparatus, it is important to perform appropriate signal processing with respect to each characteristic of the image region in the original document image. For this reason, the image processing apparatus discriminates characteristics of the inputted image signals obtained by the image scanner.

However, it is difficult to obtain the exact same result of image discrimination for each scan of an original document using the present technology. In other words, there will be differences in each scan due to the accuracy of the image scanner. This generates noise or a stain in the printed image even in a small area. For example, the color image processing apparatus should provide only black colorant for an edge region in a black character image or a black edge portion in a picture image, so as to obtain high quality printing. If there is a mistake in the discrimination result concerning each scan of a document image, a stain of black colorant in the edge region of the black character image would occur because another colorant would be mixed in the black edge region.

To overcome the above mentioned problems, an image processing apparatus is disclosed in U.S. Pat. No. 5,189,523, which is hereby incorporated by reference. The image processing apparatus includes a bit map memory with an address counter for storing the image discrimination results. The apparatus provides a pre-scan, that is, an additional image scan before the image forming operation starts, and stores the image discrimination result in the bit map memory with respect to each pixel. Then, the apparatus assesses the image forming operation to provide the appropriate processing after a next scanning for forming the image. Accordingly, it is possible to use the same discrimination result in each image forming operation with respect to C, M. Y, and K colorants.

However, the conventional apparatus requires a large amount of bit map memories for storing the image discrimination results with respect to each pixel. An example of a memory amount required to store a discrimination result in the bit-map memory is as follows:

Document Size: A4 (297 mm×210 mm)

Input Pixel Density: 16 dots per mm

Memory Amount: (297×16)×(210×16)=15966720 bits

The above mentioned memory amounts, approximately 16 megabyte, would be provided for each discrimination result in the conventional image processing apparatus. Therefore, the amount of memory required to provide an image processing apparatus which generates high quality images cannot be achieved at a reasonable cost.

SUMMARY OF THE INVENTION

Accordingly, one object of the present invention is to provide a novel image processing apparatus which prevents inferiority of image quality caused by discrimination errors in image characteristics in the image scans for forming a color image.

Another object of the present invention is to reduce the amount of memory required to store the discrimination of image characteristics results so as to control processing of the image signal for forming a high quality image.

In the present invention, an image processing apparatus provides color image signals of an original document by image scan. A plurality of image discriminating units are provided. An edge discrimination unit discriminates edge regions with respect to each pixel. The other discrimination units discriminate other image regions, such as half tone regions, white background regions, photograph regions, or color regions, with respect to each pixel block. The other discrimination results are stored in a memory.

When processing the image signals in the first image scan of the original document, the apparatus obtains the edge discrimination result and the other discrimination results. Then, on and after the second image scan, the apparatus does not obtain further image discrimination except for edge discrimination, and utilizes the discriminating results stored in the memory.

Accordingly, the present invention provides edge discrimination for each scan of image. Furthermore, the present invention provides the other image discriminations only for the first scan, stores the discrimination results of the first scan in the memory, and provides the stored results on and after the second scan.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2(a) and 2(b) are examples of matrices of filter coefficients of the present invention;

FIG. 3 illustrates an example of discrimination units which discriminate per pixel;

FIG. 4 illustrates an example of discrimination units which discriminate per block of a plurality of pixels;

FIG. 6 illustrates extraction of block characteristics in the present invention.

DESCRIPTION OF THE PREFERRED EMBODIMENTS

Figure 1:
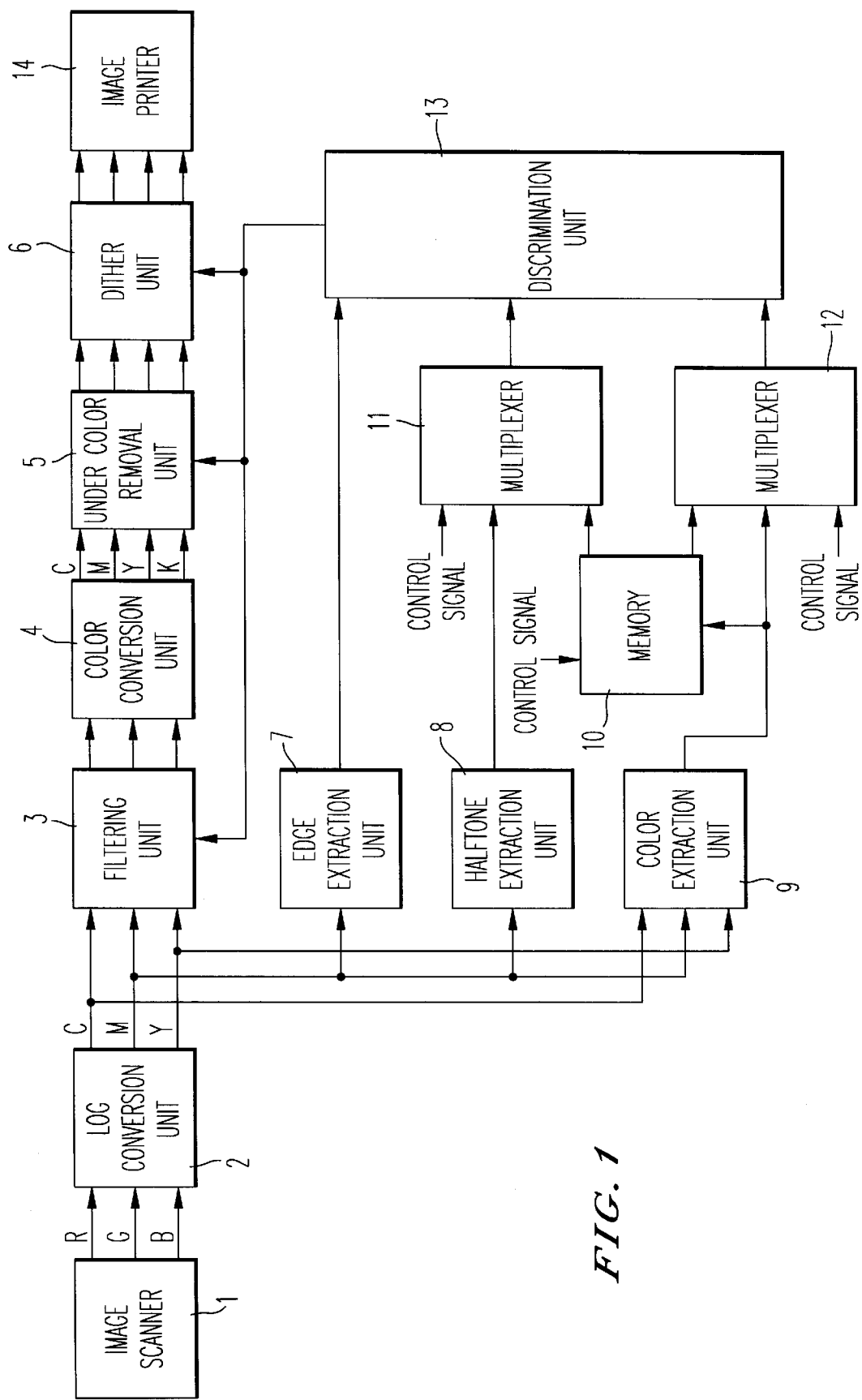
FIG. 1 illustrates a block diagram of a first embodiment of the present invention.

Referring now to the drawings, wherein like reference numerals designate identical or corresponding parts throughout the several views, and more particularly to FIG. 1 thereof, FIG. 1 illustrates an embodiment of the present invention with a digital color copying machine. The digital color copying machine, also referred to as an image processing apparatus, includes an image inputting unit 1, a log conversion unit 2, a filtering unit 3, a color conversion unit 4, an under color removable unit 5, a dither processing unit 6, an edge extraction unit 7, a half tone extraction unit 8, a color extraction unit 9, a bit-map memory 10, multiplexers 11 and 12, a discrimination unit 13, and an image printer 14.

The image input unit 1, typically an image scanner, provides for inputting color image signals with a CCD (Charged Coupled Device). The original document images are acquired by the image scanner as raster image data represented with a 400 dpi (dot per inch) resolution, having an eight bit (256 tone) density level of reflectance provided as a linear signal. Each scanning operation of the image input unit 1 provides a color image signal represented using Red, Green, and Blue (RGB) signals for each pixel. However, it is difficult to obtain identical image signals with respect to each scan of the same image with the present technology. Because the image scanner 1 does not have sufficient accuracy to provide the same signals in each scan for approximately 16 million pixels with eight bit density levels, discrimination errors occur. The original document images scanned by the image input unit 1 include not only binary image regions, such as a monochrome text image, but also may include photograph or half tone regions.

In the present embodiment, the image input unit 1 provides four image scans so as to obtain C, M, Y, and K colorants. The black print signal (K) is generated from the R, G, B, signals obtained in the first image scan. Next, a scanning operation for forming an image with respect to the C, M, Y colorants may be carried out. However, a pre-scan may be provided before the image forming process starts in another embodiment of the present invention.

The image printer 14 may be implemented as a color laser printer which includes a photosensitive drum and four image development units using cyan (C), magenta (M), yellow (Y), and black (K) toner, respectively. The four image development systems develop static latent images on the photosensitive drum for generating a toner image which is transferred to a recording paper using an electro-photographic process. The image input process is repeated four times to obtain color image signals with respect to colorants C, M, Y, and K. Then, the image developing process is repeated four times with respect to C, M, Y, and K toners. However, using an alternative printing unit such as a color ink jet printer or a sublimation-type color printer, or other types of color printers does not depart from the scope of this invention.

The log conversion unit 2 converts inputted color image signals of RGB format into color image signals of CMY format.

The filtering unit 3 executes spatial filtering on the image signals. FIGS. 2(a) and 2(b) are examples of filtering coefficients in the filtering unit 3 of the present embodiment. FIG. 2(a) shows coefficients of the smoothing filter, and FIG. 2(b) shows coefficients of the edge enhancement filter. The smoothing filter and the edge enhancement filter are connected serially in the filtering unit 3 and execute spatial convolution processes to a reference image signal. When the discrimination unit 13 discriminates the reference image signal as a black character image or a color character image, the filtering unit 3 omits the smoothing filtering process, and provides only the edge enhancement filtering process for the reference image signal.

The color conversion unit 4 converts the c, m, y signals into the C, M, Y signals. The color conversion unit 4 executes a masking process to the reference image signal using predetermined complementary coefficients stored in the color conversion unit 4. The color conversion unit 4 also generates a black component signal (K) from the minimum value of the c, m, and y signals.

The UCR (Under Color Removal) unit 5 executes an under color removal process to the reference image signal so as to control the K signal, which corresponds to the amount of black colorant in the printer 14. Then USR unit 5 generates C, M, Y signals which have eliminated the value of the K signal.

When the discrimination unit 13 discriminates the reference image signal as a black character region, the UCR unit 5 converts the C, M, and Y signal values to 0, and outputs only the K signal with respect to the reference image signal. When the discrimination unit 13 discriminates the reference image signal as a color character region, the UCR unit 5 passes the reference image signal through the UCR unit 5, without conversion of signal value. In another condition of the image discrimination, the UCR unit 5 provides a conversion to the reference image signals of C, M, Y, and K, using the following expressions, and outputs C' M', Y", and K' signals.

$$K'=0.6 \times K$$

$$C'=C-K'$$

$$M'=M-K'$$

$$Y'=Y-K'$$

The dither processing unit 6 converts the image signal to be inputted to the image printer 14 so as to control a gradation and a resolution of the reference image signal. The dither processing unit 6 stores a plurality of threshold tables for converting the image signal using a signal value and an address of the reference image signal. When the discrimination unit 13 discriminates the reference image signal as a character image, the dither processing unit 6 provides the converted signal to the image printer 14 so as to represent high resolution in the output image. In another condition, the dither processing unit 6 provides the converted signal which represents gradation in the output image.

The edge extraction unit 7, the half tone extraction unit 8, and the color extraction unit 9 execute the image discrimination process of the present embodiment. Each extraction unit is provided for parallel operation on the input image signals as shown in FIG. 1. The edge extraction process operates on each pixel, and the other extraction operates on predetermined units of pixels, such as a block region composed of 4×4 pixels.

The edge extraction unit 7 extracts the edge regions, such as an edge of a character image, with respect to each pixel. Preferably, the edge extraction of the present invention is a pattern matching process using successive black pixel patterns and successive white pixel patterns. Each pattern is predetermined using a characteristic of the edge region. Though each pixel pattern includes a pixel block, the edge extraction results are provided for each pixel. Therefore, the result of the edge extraction may be changed for each pixel, as shown in FIG. 3. An example of the operation of the edge extraction unit 7 is disclosed in U.S. Pat. No. 5,148,495, which is hereby incorporated by reference.

The half tone extraction unit 8 extracts the half tone region, such as a printed photograph, with respect to each block of pixels. Preferably, the half tone extraction of the present invention counts a peak density of pixels in a predetermined reference block, such as a block region composed of 4×4 pixels. The half tone region is composed by concentration of the peak density pixels which provide relatively high density or relatively low density, compared with a neighborhood of the peak density pixels. If the counting value of the peak density pixels reaches a predetermined threshold, the reference block is extracted as the half tone region. Therefore, the half tone extraction results are provided for each reference block and may be changed in each block, as shown in FIG. 4. An example of the process of the half tone extraction unit 8 is disclosed in U.S. Pat. No. 5,025,481, which is hereby incorporated by reference.

The color extraction unit 9 extracts the chromatic region with respect to each block of pixels. The color extraction process operates on units of predetermined pixels, such as a block region composed of 4×4 pixels. Therefore, the result of the color extraction may be changed for each block.

In the first step of the color extraction process, the color extraction unit 9 processes a difference of each color signal of the reference pixel, that is, C–M, M–Y, and Y–C. Then the color extraction unit 9 compares the maximum difference of color signal with a predetermined threshold so as to discriminate whether the reference pixel is a chromatic pixel or not. Then, the color extraction unit 9 counts the chromatic pixels in a reference block, such as 4×4 pixels. The color extraction unit 9 compares the counted value with a predetermined threshold so as to discriminate whether the reference block is a chromatic region or not. If the counted value is larger than the threshold, the color extraction unit 9 discriminates the reference block as a color region.

The multiplexers 11 and 12 select extraction results of the half tone extraction unit 8 and the color extraction unit 9, and the stored results of the bit-map memory 10, using a control signal which is provided from the image scanner 1.

In the first image scan, for obtaining the black component signal from the original image, the image signals are provided to each of the extraction units 7, 8, and 9, respectively, as shown in FIG. 1. Then, the discrimination results of the half tone extraction unit 8 and the color extraction unit 9 are stored in the bit-map memory 10 with respect to each block of the unit of discrimination. Furthermore, in the first scan, the multiplexers 11 and 12 provide the extraction results of the half tone extraction unit 8 and the color extraction unit 9 for the discrimination unit 13 using the control signal from the image scanner 1. In the second through fourth scans of the same image, the multiplexers 11 and 12 provide the stored results of the bit-map memory 10 for the discrimination unit 13 using the control signal.

Accordingly, in the present embodiment, the edge extraction unit 7 discriminates the edge region for each scan of the same image. Therefore, the stored results of the memory 10 and the results of the edge extraction unit 7 are combined on and after the second scan for the same document in the present invention.

The discrimination unit 13 discriminates the image characteristics responsive to the discriminating result of the edge extraction unit 7, the half tone extraction unit 8, and the color extraction unit 9. When the edge extraction result is "active", the half tone extraction result is "negative", and the color extraction result is "negative", the discrimination unit 13 discriminates the reference image signal as in the black character image region. Additionally, when the edge extraction result is "active", the half tone extraction result is "negative", and the color extraction result is "active", the discrimination unit 13 discriminates the reference image signal as in the color character image region. In another condition, the discrimination unit 13 discriminates the reference image signal as in the photographic image region. The discrimination unit 13 provides the image discrimination result to the filtering unit 3, UCR unit 5, and the dither unit 6, so as to control the processing in each unit, as described above.

Accordingly, in the present invention, the image discrimination process is controlled by the discrimination result of the edge extraction unit 7 per pixel in each scan, and the stored results in the memory 10 per block which are stored in the first scan. Such control is efficient to reduce the required amount of memory in the image processing apparatus.

Furthermore, the present invention prevents generation of noise or a stain in the boundary portion of the black edge region in a color photographic image. Errors in edge discrimination caused by the accuracy of the image scanner highly influence the quality of a printed image, especially for the black edge region in a character image or a picture image. However, the present invention provides an edge extraction process per pixel that weakens the influence of discrimination errors on a printed image.

In this embodiment, the amount of memory required for storing the discriminating results of the image characteristic is reduced. An example of an amount of memory required to store a discrimination result in a bit-map memory in units of a block region composed by 4×4 pixels is as follows:

Document Size: A4 (297 mm×210 mm)

Input Pixel Density: 16 dots per mm

Memory Amount: (297×16/4)×(210×16/4)=997920 bits

Figure 5:
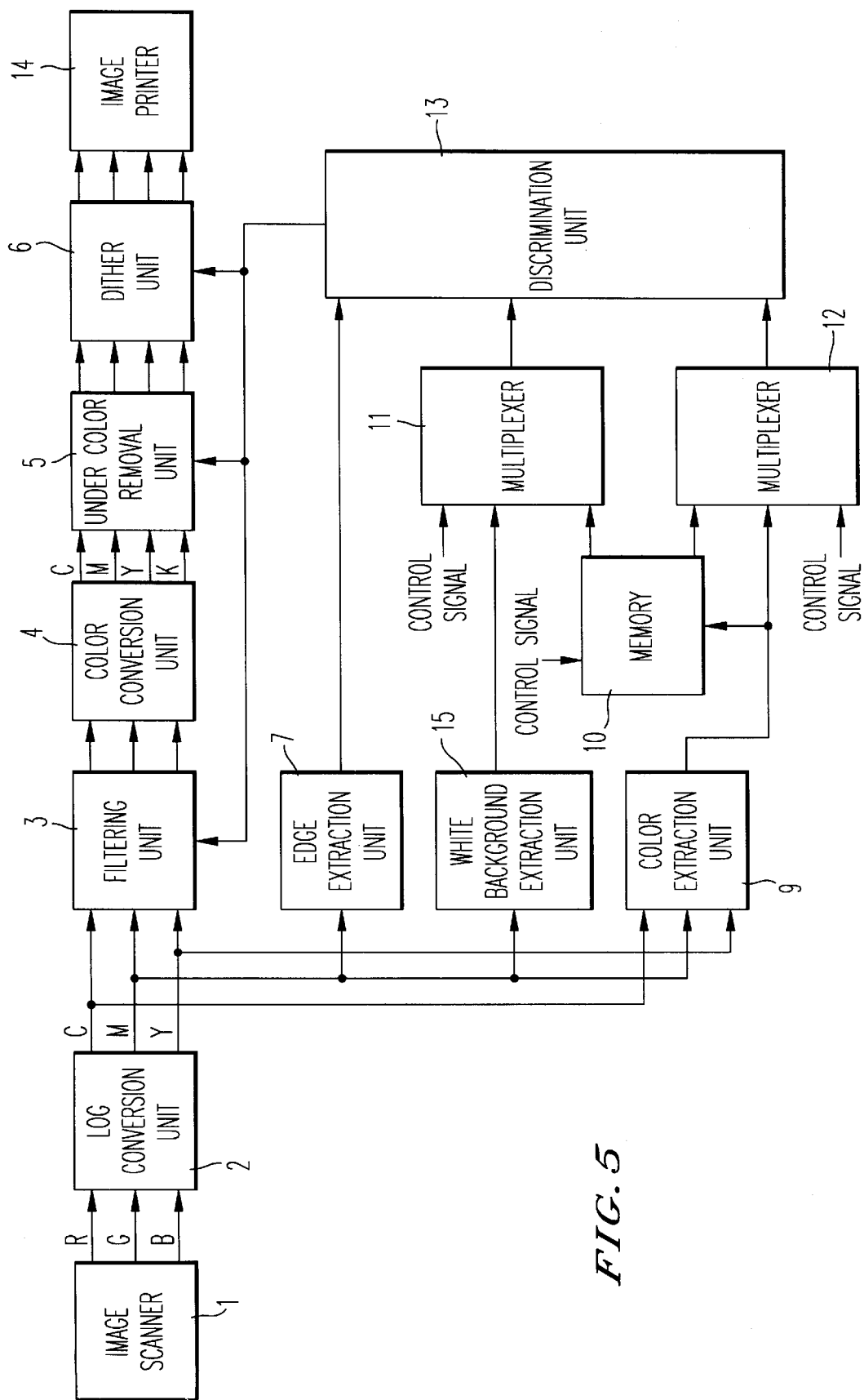
FIG. 5 illustrates a block diagram of a second embodiment of the present invention.

FIG. 5 illustrates a second embodiment of the present invention. As shown in FIG. 5, in place of the half tone extraction unit 8, the second embodiment is provided with a white background extraction unit 15. The white background extraction unit 15 extracts a block of white pixels which is in a neighborhood of the reference block.

In the first step of the while background extraction process, the white background extraction unit 15 processes the maximum value of each color signal c, m, y of the reference pixel. When the maximum value is smaller than a predetermined threshold, the white background extraction unit 15 discriminates the reference pixel as a white pixel. Then, the white background extraction unit 15 counts the white pixels in a reference block, such as a 4×4 block of pixels, and compares the counted value with a predetermined threshold so as to discriminate whether the reference block is a candidate block of a white background or not. Then, the white background extraction unit 15 examines the candidate block whether another candidate block exists or not, within a range of two blocks in a direction of the main scan line, as shown in FIG. 6. If there is another candidate block, the white background extraction unit 15 discriminates the candidate block as a white background region.

In this embodiment, the discrimination unit 13 discriminates the image characteristic responsive to the discrimination result of the edge extraction unit 7, the white background extraction unit 15, and the color extraction unit 9. When the edge extraction result is "active", the white background extraction result is "active", and the color extraction result is "negative", the discrimination unit 13 discriminates the reference image signal as in the black character image region. Additionally, when the edge extraction result is "active", the white background extraction result is "active", and the color extraction result is "active", the discriminating unit 13 discriminates the reference image signal as in the color character image region. In another condition, the discrimination unit 13 discriminates the reference image signal as in the photographic image region.

Figure 7:
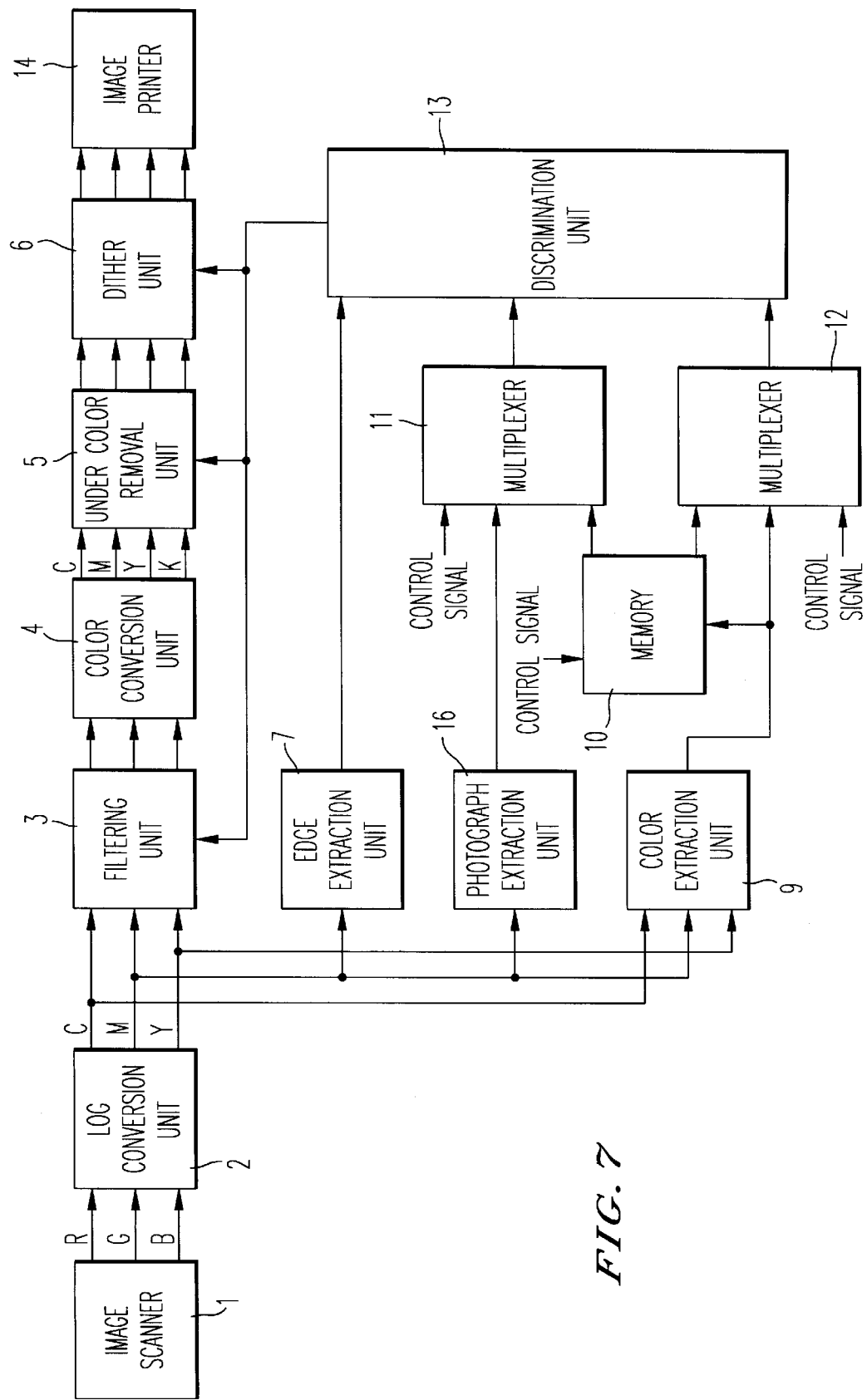
FIG. 7 illustrates a block diagram of a third embodiment of the present invention.

FIG. 7 illustrates a third embodiment of the present invention. As shown in FIG. 7, in place of the half tone extraction unit 8, this embodiment is provided with a photograph extraction unit 16. The photograph extraction unit 16 extracts a block of photograph pixels.

In the first step of the photograph extraction process, the photograph extraction unit 16 discriminates a magenta value of the reference pixel, and whether the value is in a range which is defined by predetermined thresholds of high and low values. If the magenta value of the reference pixel is in the predetermined range, the photograph extraction unit 16 discriminates the reference pixel as a middle value pixel. Then, the photograph extraction unit 16 counts the middle value pixels in a reference block, such as a 4×4 block of pixels. Then, the photograph extraction unit 16 compares the counted value with a predetermined threshold so as to discriminate whether the reference block is a candidate of the photograph block or not. Then, the photograph extraction unit 16 examines the candidate block whether another candidate block exists or not, within a range of two blocks in a direction of the main scan line, as shown in FIG. 6. If there is another candidate block, the photograph extraction unit 16 examines the candidate block whether another candidate block exists or not, within a range of two blocks in a direction of the main scan line, as shown in FIG. 6. If there is another candidate block, the photograph extraction unit 16 discriminates the candidate block as a photograph region.

In this embodiment, the discrimination unit 13 discriminates the image characteristic responsive to the discrimination result of the edge extraction unit 7, the photograph extraction unit 16, and the color extraction unit 9. When the edge extraction result is "active", the photograph extraction result is "negative", and the color extraction result is "negative", the discrimination unit 13 discriminates the reference image signal as in the black character image region. Additionally, when the edge extraction result is "active", the photograph extraction result is "negative", and the color extraction result is "active", the discrimination unit 13 discriminates the reference image signal as in the color character image region. In another condition, the discrimination unit 13 discriminates the reference image signal as in the photographic image region.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An image processing apparatus comprising:

image input means for scanning an original document and generating a plurality of image signals representing an image of said original document;

first image discriminating means for discriminating first image characteristics of the original document image with respect to each pixel thereof, to obtain first discriminating results;

second image discriminating means for discriminating second image characteristics of said original document image with respect to each predetermined size block region of pixels thereof, to obtain second discrimination results;

memory means for storing said second discrimination results; and image processing means for processing said plurality of image signals in accordance with said first and second image discriminating results obtained from a first scanning of said original document, and for processing image signals generated by subsequent scans of said original document using said first discrimination results from said subsequent scans and using said stored second discrimination results for said subsequent scans.

2. An image processing apparatus according to claim 1, wherein said first image discriminating means discriminates an edge region with respect to each pixel of said original document image.

3. An image processing apparatus according to claim 1, wherein said second image discriminating means discriminates a half tone region with respect to each predetermined size block region of pixels of said original document image.

4. An image processing apparatus according to claim 1, wherein said second image discriminating means discriminates a white background region with respect to each predetermined size block region of pixels of said original document image.

5. An image processing apparatus according to claim 1, wherein said second image discriminating means discriminates a photograph region with respect to each predetermined size block region of pixels of said original document image.

6. An image processing apparatus according to claim 1, wherein said second image discriminating means discriminates a color region with respect to each predetermined size block region of pixels of said original document image.

7. An image processing apparatus according to claim 1, wherein said image processing means executes an image forming operation for a black colorant in the first scan of said original document, and executes image forming operations for another colorant in subsequent scans of said original document.

8. An image processing apparatus comprising:

an image scanner scanning an original document and generating a plurality of image signals representing an image of said original document;

a first image discriminating circuit discriminating first image characteristics of the original document image with respect to each pixel thereof, to obtain first discriminating results;

a second image discriminating circuit discriminating second image characteristics of said original document image with respect to each predetermined size block region of pixels thereof, to obtain second discrimination results;

a memory storing said second discrimination results; and at least one image processor for processing said plurality of image signals in accordance with said first and second image discriminating results obtained from a first scanning of said original document, and for processing image signals generated by subsequent scans of said original document using said first discrimination results from said subsequent scans and using said stored second discrimination results for said subsequent scans.

9. An image processing apparatus according to claim 8, wherein said first image discriminating circuit discriminates an edge region with respect to each pixel of said original document image.

10. An image processing apparatus according to claim 8, wherein said second image discriminating circuit discriminates a half tone region with respect to each predetermined size block region of pixels of said original document image.

11. An image processing apparatus according to claim 8, wherein said second image discriminating circuit discriminates a white background region with respect to each predetermined size block region of pixels of said original document image.

12. An image processing apparatus according to claim 8, wherein said second image discriminating circuit discriminates a photograph region with respect to each predetermined size block region of pixels of said original document image.

13. An image processing apparatus according to claim 8, wherein said second image discriminating circuit discriminates a color region with respect to each predetermined size block region of pixels of said original document image.

14. An image processing apparatus according to claim 8, wherein said at least one image processor executes an image forming operation for a black colorant in the first scan of said original document, and executes image forming operations for another colorant in subsequent scans of said original document.

* * * * *